(12) United States Patent
Wang et al.

(10) Patent No.: US 8,754,566 B2
(45) Date of Patent: Jun. 17, 2014

(54) ASSEMBLING METHOD FOR A STATOR AND STATOR PRODUCED THEREBY

(75) Inventors: Ruimei Wang, Qingdao (CN); Xianfa Li, Qingdao (CN); Liang Sun, Qingdao (CN); Sifa Gao, Qingdao (CN)

(73) Assignee: Nidec Motor Corporation, St. Louis, MO (US)

( * ) Notice: Subject to any disclaimer, the term of this patent is extended or adjusted under 35 U.S.C. 154(b) by 758 days.

(21) Appl. No.: 12/970,336

(22) Filed: Dec. 16, 2010

(65) Prior Publication Data
US 2011/0148245 A1 Jun. 23, 2011

(30) Foreign Application Priority Data

Dec. 16, 2009 (CN) .......................... 2009 1 0259884
Dec. 16, 2009 (CN) ....................... 2009 2 0293410 U

(51) Int. Cl.
*H02K 1/12* (2006.01)
(52) U.S. Cl.
USPC .......... 310/254.1; 310/216.015; 310/216.127; 310/216.128; 310/216.016
(58) Field of Classification Search
CPC ......... H02K 1/148; H02K 1/145; H02K 1/85; H02K 1/187
USPC .................... 310/216.015, 216.016, 216.058, 310/216.079, 216.081–216.085, 216.098, 310/216.127, 216.128, 254.1
See application file for complete search history.

(56) References Cited

U.S. PATENT DOCUMENTS

| | | | |
|---|---|---|---|
| 5,223,761 A * | 6/1993 | Larsen ................... | 310/216.059 |
| 6,400,059 B1 | 6/2002 | Hsu | |
| 6,404,095 B1 | 6/2002 | Hsu | |
| 6,583,530 B2 | 6/2003 | Hsu | |
| 6,781,278 B2 | 8/2004 | Liao | |
| 6,941,644 B2 * | 9/2005 | Shteynberg et al. ............ | 29/605 |
| 7,538,467 B2 | 5/2009 | Engquist | |
| 7,679,255 B2 | 3/2010 | Evans | |
| 7,705,311 B2 | 4/2010 | Nishizawa | |
| 2004/0113511 A1* | 6/2004 | Schmidt et al. ............... | 310/218 |
| 2006/0071574 A1* | 4/2006 | Stewart ......................... | 310/218 |
| 2007/0176510 A1* | 8/2007 | Roos et al. .................... | 310/216 |
| 2007/0296301 A1* | 12/2007 | Lim .............................. | 310/216 |
| 2008/0211322 A1* | 9/2008 | Heinrich et al. ................ | 310/12 |
| 2009/0324435 A1* | 12/2009 | Sears et al. .................. | 417/423.7 |
| 2010/0275660 A1* | 11/2010 | Yoon et al. ...................... | 68/212 |

* cited by examiner

*Primary Examiner* — Terrance Kenerly
(74) *Attorney, Agent, or Firm* — Senniger Powers LLP

(57) ABSTRACT

A laminated stator and a method for making a laminated stator of an electric motor. The method includes arranging a plurality of stator laminations into lamination stacks spaced axially from one another, each lamination stack including a first group of stator laminations including an annular portion and a plurality of tooth portions extending from a periphery of the annular portion, and a second group of stator laminations including only tooth portions positioned to correspond with the tooth portions of said first group. The method further includes winding stator windings around selected subsets of the plurality of teeth while the lamination stacks are spaced axially and meshing the lamination stacks with one another so the annular portions of the lamination stacks are axially adjacent one another and the plurality of teeth are intermeshed with the plurality of another stack.

21 Claims, 5 Drawing Sheets

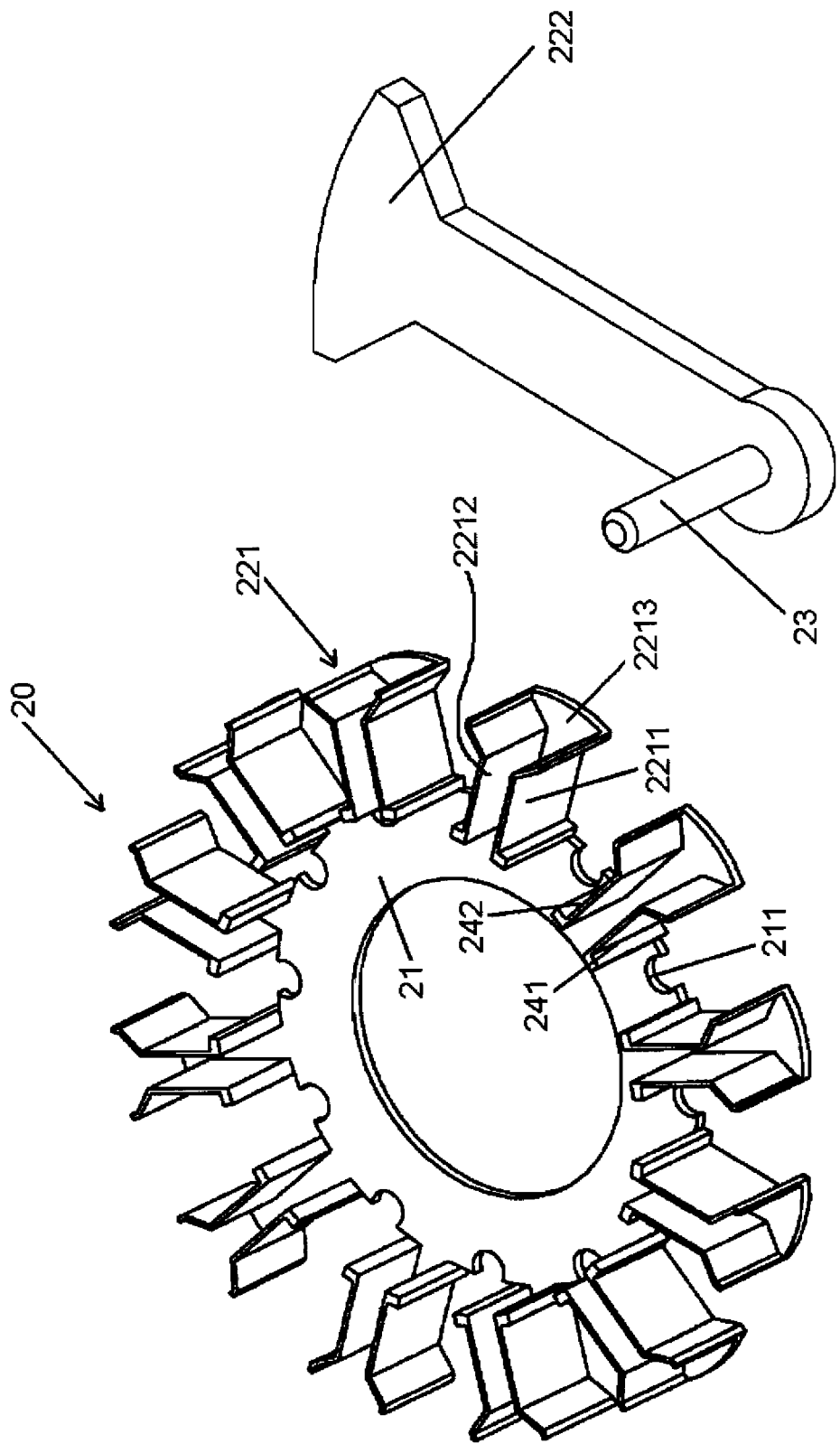

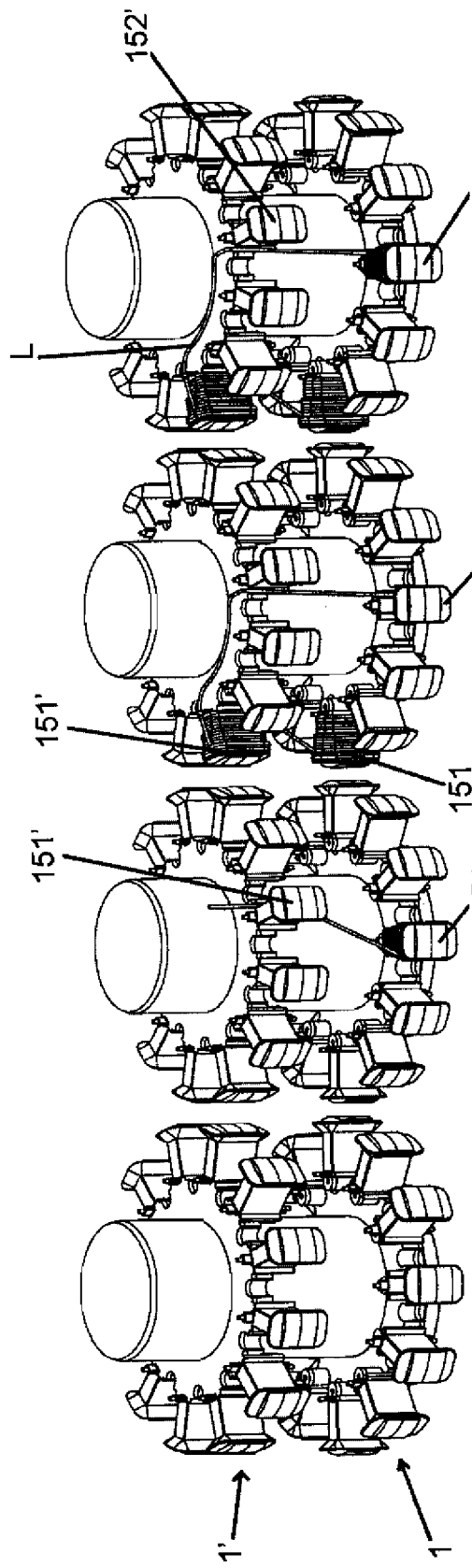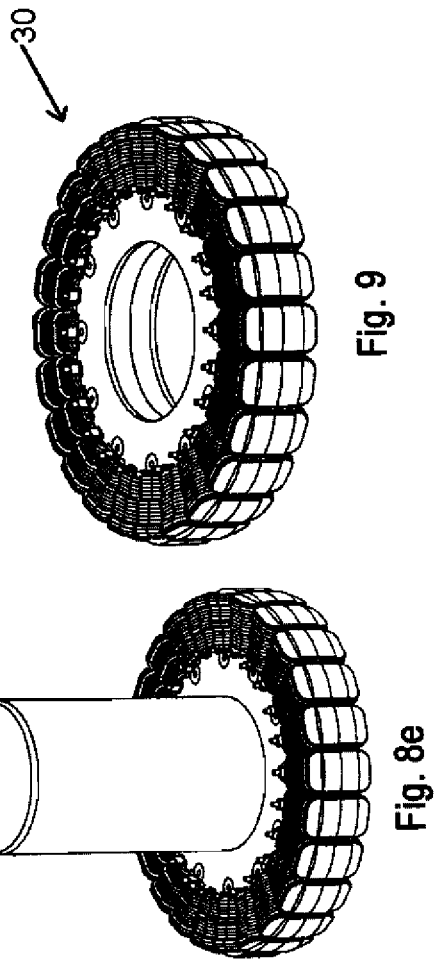

ASSEMBLING METHOD FOR A STATOR AND STATOR PRODUCED THEREBY

CROSS-REFERENCE TO RELATED APPLICATION

This application is claims priority to Chinese Patent Application No. 200910259884.1, filed Dec. 16, 2009 and Chinese Patent Application No. 200920293410.4, filed Dec. 16, 2009, which are both hereby incorporated by reference.

FIELD OF THE INVENTION

The present invention generally relates to an assembling method for a stator, and specifically to a method for assembling a laminated stator of a motor and a stator produced by the method.

BACKGROUND

Referring to FIG. 10, a conventional monolithic iron stator core 2 for a brushless permanent magnet motor includes an annular hub 3 having a central circular hole 4 and a plurality of stator teeth 5 extending radially outward from the hub. Each adjacent pair of stator teeth 5 defines a slot 6 for receiving wire (not shown) wound around the corresponding teeth. Each tooth 5 includes a free end or tip 7 having an arcuate outer surface 8. In the illustrated core 2, the arcuate surface 8 of each stator tooth 5 is concentric with the circular hole 4. There is a narrow gap 9 between each adjacent pair of free end 7 of the stator teeth 5. During assembly of the stator, a winding needle (not shown) passes through the gaps 9 as it winds electrically conductive wires around each tooth 5 to form stator windings.

Due to the width of the winding needle, the narrow gap 9 must not be made too narrow. Yet, the gap 9 should not be too wide. If the gap 9 is too wide this will have an undesirable impact on performance of the motor. Therefore, the conventional monolithic stator core 2 has the following disadvantages: It is difficult to wind stator windings around the teeth 5; there is a low slot fill factor; and there is low utilization of material.

Although a high slot fill factor can be achieved by conventional segmented stator structures, the assembling process after wire winding is complicated because the multiple stator segments have to be assembled together to form the stator core and numerous wire connections may be needed to connect the stator windings.

A variety of structures have been proposed to solve the problems associated with a conventional monolithic stator cores. For example, in the stator structures disclosed in U.S. Pat. No. 6,583,530 B2, U.S. Pat. No. 6,404,095 B1, and U.S. Pat. No. 6,400,059 B1, each tooth is wound individually while it is separate from the rest of the stator, and then the teeth are connected to segmented stator yokes after the windings are already on the teeth and assembled to form a stator using interlocking structures on the teeth. The assembly process for these stators is complicated, adding to manufacturing costs.

U.S. Pat. No. 6,781,278 B2 discloses another example of a stator structure. Wire is wound around electrically insulating tooth rings to form the stator windings. Then a stator tooth is inserted into each tooth ring and secured to the stator body by means of a positioning pin to form the stator. This stator structure is difficult to assemble because all the teeth have to be inserted into corresponding slot structures in the stator body to assemble the stator and the positioning pins have to be inserted into a notch formed between the stator body and each tooth.

In the stator structures disclosed in US 2009/0183357 A1 and U.S. Pat. No. 7,538,467 B2, two initially separate stator magnetic yoke modules made from a moldable magnetic powder material are joined to form a stator core. After the yoke modules are joined, stator windings are wound around the teeth of the stator core. The yoke modules are configured and combined in such a way to produce a stator core that is skewed to reduce cogging. This stator core is costly to assemble and does not solve any of the problems arising from the difficulty in passing a winding needle through the relatively narrow gaps between the free ends of adjacent stator teeth to wind the stator windings around the teeth.

In the stator structures disclosed in U.S. Pat. No. 7,679,255, WO 2004/098023 A1, and WO 2006/018346 A1, the stator is formed by disposing multiple modules adjacent one another in an axial direction and combining them to form a stator core. Each module is formed from a moldable soft magnetic powder iron composite and includes a ring-shaped magnetic yoke and poles extending radially from the yoke. Each module includes a fraction of the total number of poles and the stator windings can be wound around the poles before the modules are combined.

The present invention is directed to overcoming one or more of the problems set forth above.

SUMMARY

In one aspect, the present invention includes an assembling method comprising the steps of: a) providing a plurality of lamination stacks, each of which comprises an annular portion having a central axis and a plurality of teeth arranged along the periphery of the annular portion, wherein each lamination has a same number of teeth; b) fixing the plurality of lamination stacks in sequence coaxially such that the plurality of lamination stacks are separated from each other by a predetermined axial distance; c) winding the teeth in such a way that the teeth belonging to a same phase of the stator are wound with a single continuous wire; and d) rotating the plurality of lamination stacks about a common central axis to a predetermined position, meshing the plurality of lamination stacks so that the annular portions of the plurality of lamination stacks are stacked adjacent one another along the axial direction, and the teeth of the plurality of laminations form teeth staggered along the periphery of the annular portions in such a manner that between adjacent teeth of one of the lamination stacks there is provided one tooth of each of other lamination stack.

According to the assembling method of the present invention, because the plurality of lamination stacks are fixed coaxially and separated from each other at a predetermined axial distance before winding, the space between the teeth on each lamination stack is relatively wide and this makes it much easier to carry out the winding process. A single continuous long wire can be used to wind all the teeth of the stator belonging to the same phase. As a result, the disadvantages of numerous wire connections, of the possibility of loosening of joints, eccentricity of the assembled stator, and vibration and noises of the motor can be reduced.

In one embodiment of the method, step a) comprises providing notches on the annular portion of each lamination stack, the notches being located between adjacent teeth on the periphery of the lamination stack for receiving root portions of teeth of another lamination stack. The notches can facilitate aligning the plurality of lamination stacks with one another as they are being meshed such that the meshing process can be completed smoothly.

Preferably, step a) comprises integrally forming the teeth with the annular portion of the associated lamination. The integrally forming process suitably involves molding, cutting, or other suitable methods for making a single unitary body including an annular portion and teeth. In this way, the number of steps needed to produce laminations can be reduced.

Preferably, step a) comprises forming the teeth by stacking a plurality of tooth portions having the same shape. In a specific embodiment, the plurality of tooth portions include the tooth portions extending from the annular portions of the laminations and additional separate tooth portions, which can be obtained by cutting or punching, such that the plurality of tooth portions are consistent in terms of shape, material and size favorable to forming the stator teeth.

Preferably, the tooth portions of a lamination stack are fixedly connected to each other by locking, riveting, or adhering to form the stator tooth.

Preferably, the tooth portions are aligned with positioning pins. Positioning holes for inserting positioning pins are preferably provided at root portions of the teeth portions.

Preferably, step a) comprises insulating the stator teeth from the wire wound around the teeth to form the stator windings. For example, each tooth can be enclosed in an insulating case such that all portions of each tooth are covered by the insulating casings except for the root portion and the end portion. When a single tooth is formed by stacking a plurality of tooth portions, the insulating casings can be provided with positioning pins for aligning the plurality of tooth portions.

In a specific embodiment, the number of the lamination stacks is two.

In another aspect, the present invention further provides a laminated stator obtained by the above assembling method. In other words, a laminated stator for a motor is provided that is formed by meshing a plurality of lamination stacks, each of which comprises an annular portion having a central axis and a plurality of teeth arranged along the periphery of the annular portion, and each of which has a same teeth number, wherein the annular portions of the plurality of lamination stacks are stacked axially, characterized in that, in such a stator, the teeth of the plurality of lamination stacks are staggered along the periphery of the annular portions in such a manner that between adjacent teeth of one of the lamination stacks there is provided one tooth of each of other lamination stacks, and all teeth belonging to a same phase of the stator are wound with a single continuous wire. In practice, the stator may be an inner or outer stator.

Another aspect of the invention is a stator for an electric motor. The stator includes first and second lamination stacks. Each lamination stack has: (a) a first group of stator laminations including an annular portion having a central axis and a plurality of tooth portions extending from a periphery of the annular portion; and (b) a second group of stator laminations including only tooth portions positioned to correspond with the tooth portions of said first group of stator laminations. The tooth portions of the first and second groups of lamination collectively form a plurality of stator teeth for each of the first and second lamination stacks. The annular portions of the first and second stacks are axially adjacent one another. The teeth of the first and second lamination stacks are intermeshed with one another.

Another aspect of the invention is a method for making a laminated stator of an electric motor. The method includes arranging a plurality of stator laminations into lamination stacks spaced axially from one another. Each lamination stack includes (a) a first group of stator laminations having an annular portion having a central axis and a plurality of tooth portions extending from a periphery of the annular portion; and (b) a second group of stator laminations that have only tooth portions positioned to correspond with the tooth portions of said first group of stator laminations. The tooth portions of the first and second groups of laminations collectively form a plurality of stator teeth. Stator windings are wound around selected subsets of the plurality of teeth while the lamination stacks are spaced axially from one another. The lamination stacks are meshed with one another so that the annular portions of the lamination stacks are axially adjacent one another and the plurality of teeth of each lamination stack are intermeshed with the plurality of another of the lamination stacks.

Other objects and features will in part be apparent and in part pointed out hereinafter

BRIEF DESCRIPTION OF THE DRAWINGS

FIG. 3 is a perspective view of an electrically insulating disk supporting a plurality of casings for insulating the stator teeth from the stator windings;

FIG. 4 is a perspective view of an electrically insulating cap that can be used with one of the insulating casings shown in FIG. 3;

FIG. 7 is a perspective view of a plurality of coaxially fixed lamination stacks;

FIGS. 8a-8e are perspectives illustrating steps of a process in which stator windings are wound around the teeth of the lamination stacks;

FIG. 9 is a perspective view of a stator according to one embodiment of the invention.

Corresponding reference characters indicate corresponding parts throughout the drawings.

DETAILED DESCRIPTION

Figure 1:
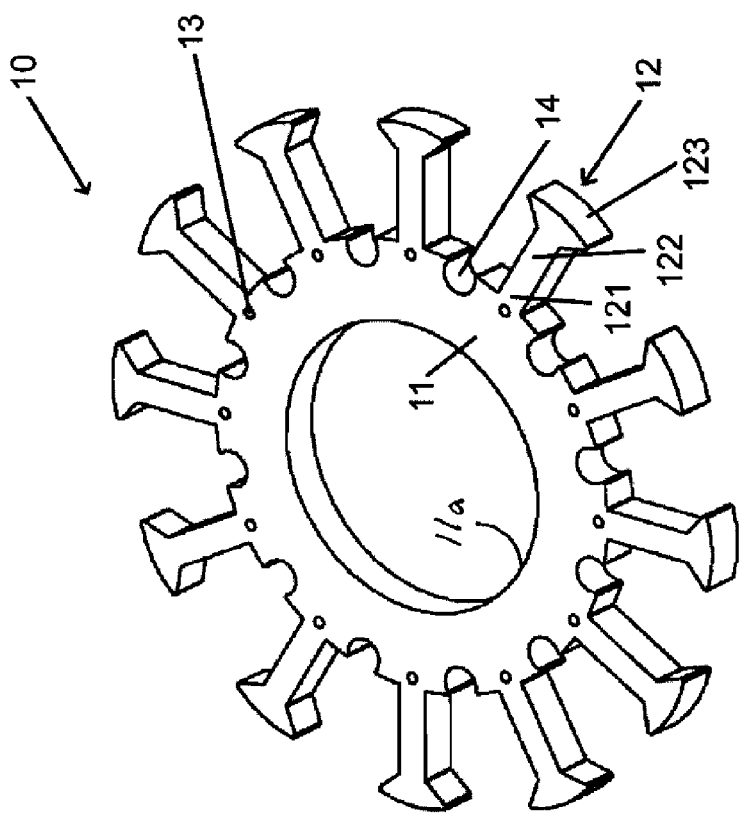
FIG. 1 is a perspective view of a group of stator laminations including an annular portion having a central axis and a plurality of teeth extending from a periphery of the annular portion.

FIG. 1 shows a group, generally designated by 10, of one or more laminations having a collective thickness smaller than that of a conventional stator. Each lamination in the group 10 has a hub or annular portion 11 and tooth portions, each generally designated by 12, arranged equi-angularly along the annular portion. Because those skilled in the art are already familiar with laminated stators it is not necessary to complicate the drawings by showing individual laminations in each view. An opening 11a (e.g., a generally circular opening) is positioned within the annular portion 11 and aligned with an imaginary central axis.

As illustrated in FIG. 1 each tooth portion 12 is generally T-shaped and has a tooth root portion 121, a tooth body portion 122 and a tooth end portion 123 that is spaced radially from a periphery of the annular portion 11. The tooth end portion 123 has an arcuate outer surface. The T-shaped configuration of the tooth portion 12 helps prevent wire slipping from the tooth as will be apparent to those skilled in the art. The arcuate surfaces of the tooth end portions 123 of the teeth lie on a common imaginary circle that is concentric with the central axis and opening 11a. Preferably, the tooth portions 12 for this group 10 of laminations are integral with the annular portion 11. As an example, each lamination in the group 10 suitably has twelve identical tooth portions 12. A positioning hole 13 is provided in the tooth root portion 121 of each tooth portion 12. Optionally, a notch 14 is positioned centrally between two adjacent teeth portions 12 on the periphery of the annular portion 11 (i.e., at a predetermined position) for reasons that will become apparent. It is conceivable that each lamination in the group 10 can be obtained by starting with a lamination having twenty-four tooth portions (or more broadly, twice as many tooth portions as the number of tooth portions for the laminations in the group 10), punching the lamination at each tooth root region to obtain the positioning hole 13, then cutting or otherwise removing alternating tooth portions to form the notches 14 and obtain the lamination 10 as shown in FIG. 1. The tooth portions removed in this process are suitably retained and will be referred to herein as tooth portion only laminations 12'.

Figure 2:
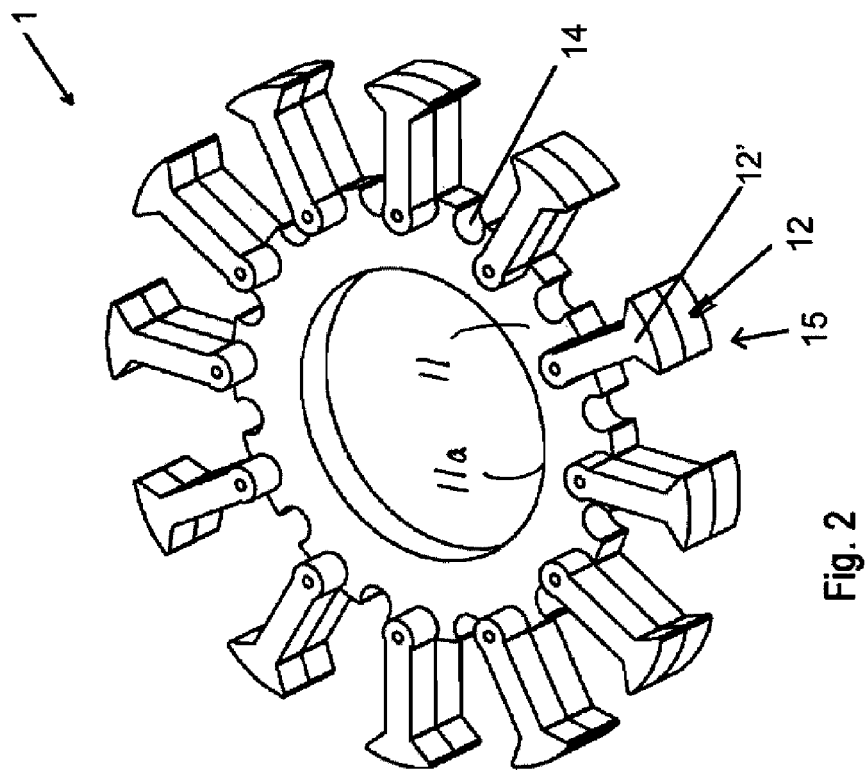
FIG. 2 is a perspective of a lamination stack formed by combining the group of laminations illustrated in FIG. 1 with another group of laminations that form only teeth.

As shown in FIG. 2, a lamination stack 1 can be obtained by stacking one or more tooth portion only laminations 12' onto the tooth portions 12 of the laminations in the group 10 shown in FIG. 1. The tooth portions 12' and 12 can be connected to one another by any suitable methods such as adhering, riveting, or interlocking. The tooth portions 12' and 12 of the first and second groups of laminations are stacked to constitute a single stator tooth 15. Thus, the lamination stack 1 includes the annular portion(s) 11 of the laminations in the first group and the tooth 15 formed by the tooth portions 12 of the laminations in the first group and the tooth portion only laminations 12' in the second group. Because of the additional laminations 12' in each tooth 15, the axial thickness of each tooth is greater than the thickness of the annular portion of the lamination stack 1. It is noted, the stator tooth 15 may also be formed integrally instead of being formed by a plurality of stacked laminations without departing from the scope of the present invention. Those skilled in the art can conceive that the stator tooth 15 can be integrally formed with the annular portion 11 of the thin sheet 10, for example by molding, or an integrally formed tooth can be connected to the annular portion 11 by an interlocking structure. The tooth portions 12' and 12 of each group of laminations are identical in shape so contours of the tooth portions can be aligned during stacking.

Figure 5:
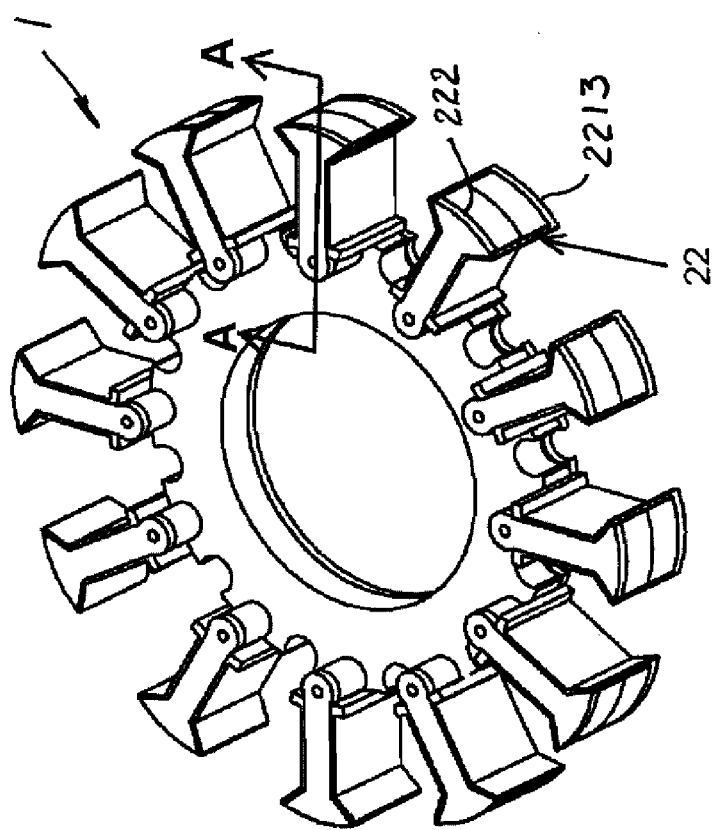
FIG. 5 is a perspective view of the lamination stack shown in Fig. having with its teeth insulated by the casings of FIG. 3 and a plurality of the caps shown in FIG. 4.

FIGS. 3 and 4 show electrical insulation 20 used for each tooth 15 of the lamination stack 1 shown in FIG. 2, and FIG. 5 shows a stator of the invention equipped with the insulation 20. The insulation 20 suitably includes a disk 21 for insulating an axially-facing surface of the annular portion 11 and insulating casings 22 along the periphery of the disk 21. The disk 21 has notches 211 disposed centrally between adjacent insulating casings 22 on the periphery of the disk to align with the notches 14 of the lamination stack 1. Each insulating case 22 is composed of a recess 221 substantially defining a space for receiving a tooth 15 and a cap 222 for covering the opening of the recess and covering an axially-facing side of a tooth 15 received in the recess. The recess 221 can be sized and shaped to receive a tooth 15 by loose or tight fit. Preferably, the opposing sides 2211, 2212 of the each casing 22 clamp the tooth 15 and the cap 222 engages a tooth portion 12' stacked at one end of the tooth and connects with the opposing sides 2211, 2212 by snap connection, so as to form an insulating casing 22 that insulates the tooth from the stator windings. The insulating casing 22 and disk 21 are suitably connected to the annular portion 11 of the lamination stack 10, including the tooth 15, by conventional means. At the edges of the two opposite sides 2211, 2212 of the casings adjacent the annular portion 11 of the lamination stack 10, laterally extending flanges 241, 242 are provided for abutting the periphery of the annular portion 11 to ensure insulation of the stator windings from the annular portion of the lamination stack 10. In the illustrated embodiment, bottom sides 2213 of the casings 22 are connected to the disk 21 or are integrally formed with the disk 21. It is noted that the disk 21 can be omitted (e.g., when the lamination is not used as an end lamination of the stator).

Figure 6:
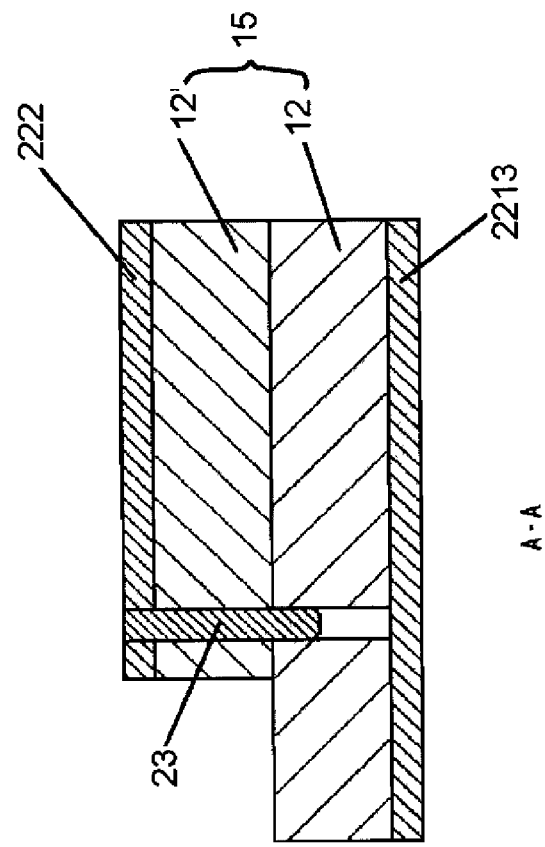
FIG. 6 is a cross-sectional view of the insulated lamination stack taken in a plane including line A-A on FIG. 5.

FIG. 4 shows the cap 222 of the insulating casing 22 has a substantially identical shape as the axially-facing side of the tooth 15. A positioning pin 23 extends from the cap 222 at a position corresponding to the position of the positioning hole 13 of the tooth portions 12, 12' of the lamination stack 10. The positioning pin 23 is suitably fixed to a side of the cap 222 facing the tooth 15 by conventional means. It is conceivable that the positioning pin 23 can alternatively be integrally formed with the cap 222. After the tooth 15 is placed within the recess 221 of the insulating casing 22, the side of the cap 222 having the positioning pin 23 is arranged to face the un-insulated axially-facing side of the tooth 15, and the positioning pin 23 is aligned with the positioning hole 13 at the tooth root portion 121 of the tooth 15. Then the positioning pin 23 is inserted into the positioning hole 13 until the cap 222 abuts the tooth 15 as shown in FIGS. 5 and 6. Once the cap is secured to the tooth 15 in this manner, the tooth is insulated from the wire to form the stator windings. The insulating casing 22 may additionally function to align the tooth portions 12 of the laminations stack 10 and the tooth only lamination portions 12' stacked to form the teeth 15. Those skilled in the art can conceive of other structures and methods for insulating the teeth from the wire, e.g., by applying an electrically insulating coating or insulation paper on each surface of the tooth 15 contacted by wire. In another embodiment, the positioning pin can be arranged on the bottom side 2213 of the casing 22 instead of on the cap 222.

The assembling method of the stator according to the present invention will be described in detail in terms of an example of an integral stator formed from two identical stacks 1, 1' of laminations as illustrated in FIG. 2.

First, two structurally identical lamination stacks 1, 1' are insulated with insulation 20, respectively, so each stack is substantially identical to the insulated stack in FIG. 5. Then, the insulated lamination stacks 1, 1' are mounted on a wire-winding fixture 301 such that the two lamination stacks are coaxial with one another and spaced axially from one another, as illustrated in FIG. 7.

Figure 10:
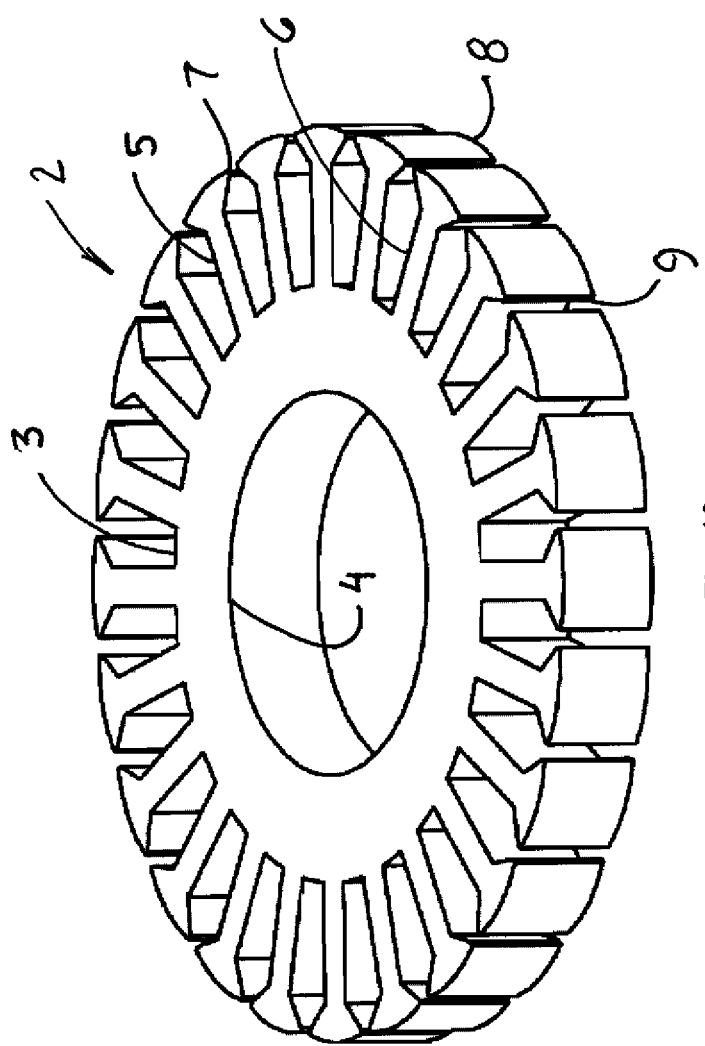
FIG. 10 is a perspective view of a monolithic stator structure in prior art.

Next, winding begins. All the teeth 15 of each stack 1, 1' are categorized as belonging to X, Y, or Z phase (taking three-phase stator as an example) before winding. Referring to FIGS. 8a-8d, a single long continuous wire is wound around each tooth 15 belonging to the same phase. As illustrated in FIG. 8a the wire is wound clockwise around a first tooth 151 of the lamination stack 1 belonging to the X-phase to form the stator windings for this tooth. Then, the continuous wire is wound counter-clockwise around a first tooth 151' of the other lamination stack 1' of the X-phase to form the stator windings for this tooth (FIG. 8b). Next, after jumping over two teeth of the lamination stack 1' (FIG. 8c), the same continuous wire is wound around a second tooth 152 of the lamination stack 1 of the X-phase, then around a second tooth 152' of the lamination 1', etc. These steps are repeated until the same continuous wire is wound around all the teeth of the lamination stacks 1, 1' belonging to the same phase X to form a complete set of X phase stator windings. During winding, segments L (FIG. 8c) of the wire skipping over teeth of the other phases are preferably arranged on the insulated lower end surface of the lamination 1 or the insulated upper end surface of the lamination 1' to prevent interference from these segments L when the laminations 1, 1' are meshed. Then, a substantially similar winding process is carried out for teeth belonging to each additional phase (e.g., for the Y-phase and Z-phase in the case of a three phase stator). The stator structure according to the present invention can be wound with wire more conveniently than the conventional stator structure because the spaces between the teeth 15 of each stack of laminations 1, 1' is much wider than the gaps 9 between the teeth 6 of the conventional stator 2 in FIG. 10 and the space for the winding needle to pass between adjacent teeth is more than doubled. In addition, because a single continuous wire is used to form the windings on all of the teeth for a particular phase, the number of wire connections is greatly reduced.

To mesh the laminations stacks 1, 1' after winding to form a stator 30, one of the laminations is rotated to align each tooth of the lamination stack 1' with a notch 14 of the other lamination stack 1 and vice versa and the lamination stacks are moved into axially abutting relation with one another, as indicated by the arrows on FIG. 8d, so the teeth of the lamination stacks are intermeshed with one another. Then the lamination stacks 1, 1' are secured to one another to retain them in position relative to one another. When intermeshed, each tooth 15 of the first lamination stack 1 is between two adjacent teeth of the second lamination stack 1' and vice versa. Also, the tooth root portions 121 of the part of the teeth 15 formed from the tooth only lamination portions 12' are received in the notches 14 of the other lamination stack 1 or 1'. The stacks 1, 1' are suitably axially spaced from one another during the winding process by a predetermined distance selected so a segment of wire 303 (FIG. 8d) extending from a tooth 15 on the first stack 1 to a tooth 15 on the second stack 1' is the correct length to bridge across one tooth for each additional phase of the stator (e.g., to bridge across two teeth in a three phase stator) in the finished stator 30. This facilitates using a single continuous wire to wind all the teeth of the same phase because it automatically results in the wire segment 303 having the proper length to bridge across the teeth of the other phases without producing unnecessary slack in the wire segment Although the lamination stacks 1, 1' are rotated relative to one another after winding, it is also possible to rotationally fix the laminations stacks 1, 1' before winding and then mesh the laminations stacks 1, 1' with one another without rotating them after winding without departing from the scope of the invention.

As shown in FIGS. 8e and 9, in the stator 30 formed by meshing the lamination stacks 1, 1' the annular portions 11 of each stack are stacked axially adjacent one another and the teeth 15 of the laminations extend radially from the peripheries of the annular portions. For aesthetics, the jumper wire segments L on the end surface of the stator can be tightened and bundled (not shown). Finally, the assembled stator 30 is removed from the wire-winding fixture 301 as shown in FIG. 9.

Although the example provided above merely shows a stator composed of two lamination stacks, those skilled in the art will appreciate that the stator of the present invention is not limited to those formed by stacking just two lamination stacks. For example, the stator can be formed by stacking three, four, or more lamination stacks.

When the stator is assembled by stacking three lamination stacks, for instance, the axial thickness of the teeth of each lamination stack is approximately three times the thickness of the annular portion of the respective lamination stack, wherein the axial length of the teeth of the upper lamination extending downward from its annular portion is 2 h, the length of the teeth of the middle lamination extending upward and downward from its annular portion each are h, and the length of the teeth of lower lamination extending upward from its annular portion is 2 h. In this case, each of the three lamination stacks has two toothless positions (e.g., where notches are formed to receive tooth root portions of the other lamination stacks) between its adjacent teeth. Winding is performed in such a manner that jumper wire does not exist on the axially-facing surfaces of the middle lamination stack, and all the teeth belonging to the same phase are wound with a single wire. After all the teeth belonging to different phases are wound with wire, the three lamination stacks are stacked axially adjacent one another to form a stator with a tooth thickness of 3 h.

When a stator is assembled from a plurality of lamination stacks, those skilled in the art will appreciate how to modify the structure of insulation means or insulation casing according to assembling or winding requirements. In addition, the teeth number of each lamination stack is not limited to the number shown in the figures and modification also can be made to the annular portion, the tooth portions 12, 12', or thickness or shape of the tooth portions 12, 12' of each lamination without departing from the scope of the present invention.

The method of winding as shown in FIGS. 8a-8d and described above is illustrative only. Modifications can be made by those skilled in the art according to structural parameters such as lamination number and tooth number.

Although the figures show an inner stator structure, the present invention can be applied to outer stator structures as well.

As illustrated by the description provided above, the stator structure produced according to the present invention has many advantages such as convenient wire winding, high slot fill factor and fewer wire connections. Accordingly, the stator structure is particularly suitable for aluminum wire. Thus, in one embodiment, the stator windings comprise aluminum.

It should apparent for those skilled in the art that various changes and modifications can be made to the stator structure of the present invention without departing from the scope of the disclosure. Other embodiments of the invention will be apparent to those skilled in the art from consideration of the description and practice disclosed herein. It is intended that the specification and examples be considered as exemplary only, with a true scope of the disclosure being indicated by the following claims and their equivalents.

What is claimed is:

1. A method for making a laminated stator of an electric motor, the method comprising:
   arranging a plurality of stator laminations into lamination stacks spaced axially from one another, each lamination stack comprising:
   a first group of stator laminations of said plurality including an annular portion having a central axis and a plurality of tooth portions extending from a periphery of the annular portion; and
   a second group of stator laminations of said plurality including only tooth portions positioned to correspond with the tooth portions of said first group of stator laminations, wherein the tooth portions of the first and second groups of laminations collectively form a plurality of stator teeth;

winding stator windings around selected subsets of the plurality of teeth while the lamination stacks are spaced axially from one another, wherein the winding comprises winding a continuous wire around a first tooth of the plurality of teeth on a first stack of said lamination stacks and winding said continuous wire around a first tooth of the plurality of teeth on a second stack of said lamination stacks; and meshing the lamination stacks with one another so that the annular portions of the lamination stacks are axially adjacent one another and the plurality of teeth of the first lamination stack are intermeshed with the plurality of teeth of the second lamination stack.

2. A method according to claim 1 wherein the winding comprises winding the stator windings around the selected subsets of the plurality of teeth in such a way that all teeth belonging to a same phase of the stator are wound with a single continuous wire.

3. A method according to claim 1 wherein the meshing comprises rotating the second stack relative to the first stack and moving at least one of the first and second stacks axially toward the other of the first and second stacks.

4. A method according to claim 1 wherein the meshing comprises inserting root portions of the plurality of teeth of the first lamination stack into corresponding notches on the periphery of the annular portions of the second lamination stack and inserting root portions of the plurality of teeth of the second lamination stack into notches on the periphery of the annular portion of the first lamination stack.

5. A method according to claim 1 wherein for each tooth of the first and second lamination stacks laminations forming said first group of stator laminations are about equal in number to the laminations forming said second group of stator laminations.

6. A method according to claim 1 wherein there are two lamination stacks.

7. A stator for an electric motor, the stator comprising first and second lamination stacks, each lamination stack comprising: (a) a first group of stator laminations including an annular portion having a central axis and a plurality of tooth portions extending from a periphery of the annular portion; and (b) a second group of stator laminations including only tooth portions positioned to correspond with the tooth portions of said first group of stator laminations, wherein the tooth portions of the first and second groups of stator laminations collectively form a plurality of stator teeth for each of the first and second lamination stacks, the annular portions of the first and second stacks are axially adjacent one another, and the teeth of the first and second lamination stacks are intermeshed with one another; and stator windings wound around the teeth, the stator windings including a continuous wire wound around a first tooth of the first lamination stack and wound around a first tooth of the second lamination stack.

8. A stator according to claim 7 wherein the stator windings are arranged for energizing a subset of the teeth with a first electrical phase of a multiphase power source, and the stator windings comprising a single continuous wire wound around all teeth in said subset.

9. A stator according to claim 7 where each lamination stack has notches on the periphery of the annular portion between the teeth of that lamination stack and the teeth of each lamination stack have root portions received in the notches of the other lamination stack.

10. A stator according to claim 7 wherein the annular portions and tooth portions of the laminations of said first group for the first and second lamination stacks are formed integrally with one another and the tooth portions of the laminations of said second group for the first and second lamination stacks are joined to the tooth portions of the laminations of said first group.

11. A stator according to claim 10 further comprising a fastener for each tooth extending through the laminations of the second group and attaching the laminations of the of the second group to the tooth portions of the laminations of the first group.

12. A stator according to claim 10 wherein the first group of laminations has notches on the annular portions between the teeth and the second group of laminations for each lamination stack has root portions extending into the notches of the other lamination stack.

13. A stator according to claim 12 wherein the stator comprises joints where the root portions of the second group of laminations for each stack abut the annular portions of the first group of laminations in the other lamination stack.

14. A stator according to claim 7 wherein the stator further comprises electrical insulation insulating the stator windings from the teeth.

15. A stator according to claim 14 wherein the electrical insulation comprises:

a plurality of casings, each of the casings being adapted to enclose three sides of a tooth including a first axially-facing face of the tooth and a pair of opposite sides of the tooth extending axially from said first axially-facing face; and a plurality of caps, each cap being adapted to cover a second axially-facing face of the tooth opposite the first axially facing face of the tooth.

16. A stator according to claim 15 further comprising positioning pins extending from each of the caps into an opening in the second axially-facing face of each tooth, respectively.

17. A stator according to claim 15 wherein some of the caps are on a first axially-facing side of the stator and others of the caps are on a second axially-facing side of the stator opposite the first axially-facing side of the stator.

18. A stator according to claim 17 wherein the electrical insulation further comprises a first disk extending over the annular portion of the first lamination stack on the first axially-facing side of the stator, some of the casings being formed integrally with the first disk.

19. A stator according to claim 18 wherein the electrical insulation further comprises a second disk extending over the annular portion of the second lamination stack on the second axially-facing side of the stator, others of the casing being formed integrally with the second disk.

20. A stator according to claim 7 wherein the teeth extend radially outward from the annular portions of the laminations in the first group.

21. An electric motor having a stator according to claim 7.

* * * * *